US009973794B2

(12) United States Patent
Burke et al.

(10) Patent No.: US 9,973,794 B2
(45) Date of Patent: May 15, 2018

(54) DEMAND TARGET DETECTION

(71) Applicant: clypd, inc., Somerville, MA (US)

(72) Inventors: Jason M. Burke, Chestnut Hill, MA (US); Joel C. Melby, Southborough, MA (US); Peter Campbell Doe, Ridgewood, NJ (US)

(73) Assignee: clypd, Inc., Somerville, MA (US)

( * ) Notice: Subject to any disclaimer, the term of this patent is extended or adjusted under 35 U.S.C. 154(b) by 0 days. days.

(21) Appl. No.: 14/618,321

(22) Filed: Feb. 10, 2015

(65) Prior Publication Data
US 2015/0304713 A1 Oct. 22, 2015

Related U.S. Application Data

(60) Provisional application No. 61/982,481, filed on Apr. 22, 2014.

(51) Int. Cl.
| | | |
|---|---|---|
| *H04N 7/173* | (2011.01) | |
| *H04N 21/24* | (2011.01) | |
| *H04N 21/2668* | (2011.01) | |
| *H04N 21/81* | (2011.01) | |
| *H04N 21/2547* | (2011.01) | |
| *G06Q 30/02* | (2012.01) | |

(52) U.S. Cl.
CPC ..... *H04N 21/2407* (2013.01); *G06Q 30/0241* (2013.01); *H04N 21/2547* (2013.01); *H04N 21/2668* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 5,826,165 A | * | 10/1998 | Echeita | H04H 20/14 348/903 |
| 6,324,519 B1 | | 11/2001 | Eldering | |
| 6,446,261 B1 | * | 9/2002 | Rosser | H04N 7/163 348/E7.061 |

(Continued)

FOREIGN PATENT DOCUMENTS

| | | |
|---|---|---|
| CN | 103279565 A | 9/2013 |
| EP | 3120567 A1 | 1/2017 |
| WO | 0107985 A2 | 2/2001 |

OTHER PUBLICATIONS

Balakrishnan, S. et al., "Computational Television Advertising," in Data Mining\(ICDM), 2012 IEEE 12th International Conference on Data Mining Workshops, Dec. 10, 2012, pp. 71-80, IEEE, Brussels, Belgium.

(Continued)

*Primary Examiner* — Mushfikh Alam
(74) *Attorney, Agent, or Firm* — Blueshift IP, LLC; Robert Plotkin

(57) ABSTRACT

A system draws an inference about the audience being targeted by the buyer of an advertisement placement opportunity by correlating the order for the advertisement placement opportunity with characteristics of the audience associated with the television program in which the advertisement placement opportunity is embedded. Sellers of advertisement placement opportunities may use the inferred target audience information to appropriately price their advertising inventories and to fulfill orders more effectively.

22 Claims, 2 Drawing Sheets

(56) References Cited

U.S. PATENT DOCUMENTS

| | | |
|---|---|---|
| 7,861,260 B2 | 12/2010 | Shkedi |
| 8,000,993 B2 | 8/2011 | Harvey |
| 8,249,925 B2 | 8/2012 | Broms |
| 8,504,905 B1 | 8/2013 | Sugnet |
| 8,533,755 B1 | 9/2013 | Sherwin |
| 8,583,471 B1 | 11/2013 | Voskuhl |
| 8,660,539 B2 | 2/2014 | Khambete |
| 8,677,401 B2 | 3/2014 | Eldering |
| 8,739,207 B1 * | 5/2014 | Black ............ H04N 21/234336 725/35 |
| 8,776,113 B2 | 7/2014 | Sherwin |
| 9,277,275 B1 | 3/2016 | Arini |
| 2001/0004733 A1 * | 6/2001 | Eldering ................ G06Q 20/20 705/14.41 |
| 2002/0059094 A1 * | 5/2002 | Hosea .............. H04N 21/25891 725/10 |
| 2002/0083442 A1 * | 6/2002 | Eldering ................ H04N 7/165 725/34 |
| 2002/0083444 A1 * | 6/2002 | Blasko ................... G06Q 30/02 725/35 |
| 2002/0087980 A1 | 7/2002 | Eldering |
| 2002/0144262 A1 * | 10/2002 | Plotnick ............... G11B 27/005 725/32 |
| 2003/0070167 A1 * | 4/2003 | Holtz ................ G06F 17/30017 725/32 |
| 2003/0093792 A1 | 5/2003 | Labeeb |
| 2003/0101449 A1 | 5/2003 | Bentolila |
| 2003/0145323 A1 | 7/2003 | Hendricks |
| 2004/0003396 A1 | 1/2004 | Babu |
| 2004/0194128 A1 * | 9/2004 | McIntyre ............... H04N 5/272 725/32 |
| 2005/0137958 A1 | 6/2005 | Huber |
| 2006/0293947 A1 | 12/2006 | Nicholson |
| 2006/0294084 A1 | 12/2006 | Patel |
| 2007/0022442 A1 * | 1/2007 | Gil .................... G06F 17/30905 725/62 |
| 2007/0061838 A1 * | 3/2007 | Grubbs .................. H04N 7/165 725/35 |
| 2007/0156525 A1 | 7/2007 | Grouf |
| 2007/0240181 A1 * | 10/2007 | Eldering ............ H04N 21/2353 725/14 |
| 2008/0022301 A1 * | 1/2008 | Aloizos ................. G06Q 30/02 725/34 |
| 2008/0040742 A1 * | 2/2008 | Howcroft ........... H04N 7/17327 725/34 |
| 2008/0155614 A1 * | 6/2008 | Cooper ................... G06F 21/10 725/91 |
| 2008/0201731 A1 * | 8/2008 | Howcroft ............... H04H 60/46 725/13 |
| 2008/0271070 A1 | 10/2008 | Kanojia |
| 2010/0023966 A1 * | 1/2010 | Shahraray .......... H04N 5/44543 725/34 |
| 2010/0269128 A1 * | 10/2010 | Gordon ............. H04N 7/17318 725/25 |
| 2010/0269134 A1 | 10/2010 | Storan |
| 2011/0015989 A1 | 1/2011 | Tidwell |
| 2011/0016479 A1 | 1/2011 | Tidwell |
| 2011/0016482 A1 | 1/2011 | Tidwell |
| 2011/0145847 A1 | 6/2011 | Barve |
| 2011/0282732 A1 | 11/2011 | Bax |
| 2012/0023522 A1 | 1/2012 | Anderson |
| 2012/0042338 A1 | 2/2012 | Kitts |
| 2012/0227064 A1 | 9/2012 | Neill |
| 2012/0266189 A1 | 10/2012 | Zaslavsky |
| 2013/0312018 A1 * | 11/2013 | Elliott .................... H04N 21/45 725/12 |
| 2014/0074604 A1 | 3/2014 | Castillo |
| 2014/0101695 A1 | 4/2014 | Canney |
| 2014/0173652 A1 * | 6/2014 | Patel .................... H04N 21/812 725/34 |
| 2014/0196081 A1 * | 7/2014 | Emans ............... G06Q 30/0273 725/32 |
| 2014/0237496 A1 * | 8/2014 | Julian .............. H04N 21/44213 725/13 |
| 2014/0337868 A1 | 11/2014 | Garza |
| 2015/0181267 A1 * | 6/2015 | Morales ........... H04N 21/25883 725/14 |
| 2015/0181311 A1 * | 6/2015 | Navin .................. H04N 21/812 725/34 |
| 2015/0271540 A1 | 9/2015 | Melby |
| 2015/0289000 A1 * | 10/2015 | Donohue ........... H04N 21/2547 725/5 |
| 2016/0037197 A1 * | 2/2016 | Kitts ................ H04N 21/25883 725/35 |

OTHER PUBLICATIONS

Rust, et al., "Viewer preference segmentation and viewing choice models for network television," Journal of Advertising, Mar. 1992, pp. 11-18, vol. 21(1), Taylor & Francis, United Kingdom.

Rust, Roland T. et al., "An audience flow model of television viewing choice," Marketing Science, Spring, 1984, pp. 113-124, vol. 3(2), The Institute of Management Sciences/Operations Research Society of America, USA.

* cited by examiner

_(54)_ DEMAND TARGET DETECTION

BACKGROUND

In traditional television advertising, advertising opportunities are expressed in terms of airtime within a specific television program. For example, a particular advertising opportunity may be expressed to advertising buyers as a 30-second slot within a particular episode of the television program Glee, aired on Jan. 1, 2014 from 8:00 pm-9:00 pm. A buyer who purchases such an advertising opportunity purchases the placement of one or more advertisements within the airtime associated with that opportunity.

The underlying goal of advertising buyers, however, is not to provide advertisements within a particular airtime, but instead to reach an audience containing individuals who are likely to purchase the products and services advertised by such advertisements. The airtime information traditionally provided to buyers in connection with advertising opportunities, however, does not include audience information, only airtime information. As a result, buyers must resort to drawing inferences from airtime information about the audience that is likely to view a particular television program during a specified airtime. Such inferences are difficult to make with high accuracy. As a result, the traditional process of selling and purchasing television advertisement placement opportunities has been fraught with imperfect information about the audiences associated with advertising opportunities, which makes it difficult for buyers to make optimal purchasing decisions, and which can also result in advertising sellers obtaining suboptimal prices for the opportunities that they sell.

What is needed, therefore, are improved techniques for selling advertisement placement opportunities.

SUMMARY

A computer system draws an inference about the audience being targeted by the buyer of an advertisement placement opportunity by correlating the order for the advertisement placement opportunity with characteristics of the audience associated with the television program in which the advertisement placement opportunity is embedded. Sellers of advertisement placement opportunities may use the inferred target audience information to appropriately price their advertising inventories and to fulfill orders more effectively.

One embodiment of the present invention is directed to a method performed by at least one computer processor executing computer program instructions stored on at least one non-transitory computer-readable medium. The method includes: (A) receiving order data representing an order placed by a buyer for an advertising opportunity; (B) receiving audience model data representing a first plurality of attribute values of a first plurality of attributes of an audience for content associated with the advertising opportunity; (C) receiving first associated content data representing the content associated with the advertising opportunity; and (D) generating demand target data based on the order data, the audience model data, and the first associated content data, wherein the demand target data includes additional attribute data, wherein the additional attribute data includes at least one of: (1) data representing an attribute not in the first plurality of attributes; and (2) data representing an attribute value not in the first plurality of attribute values.

Other features and advantages of various aspects and embodiments of the present invention will become apparent from the following description and from the claims.

DETAILED DESCRIPTION

Embodiments of the present invention draw inferences about the audience being targeted by the buyer of an advertisement placement opportunity (also referred to as an "advertising opportunity") by correlating an order for the advertisement placement opportunity with characteristics of the audience associated with the television program in which the advertisement placement opportunity is embedded. Sellers of advertisement placement opportunities may use the inferred target audience information to appropriately price their advertising inventories and to fulfill orders more effectively.

Figure 1:
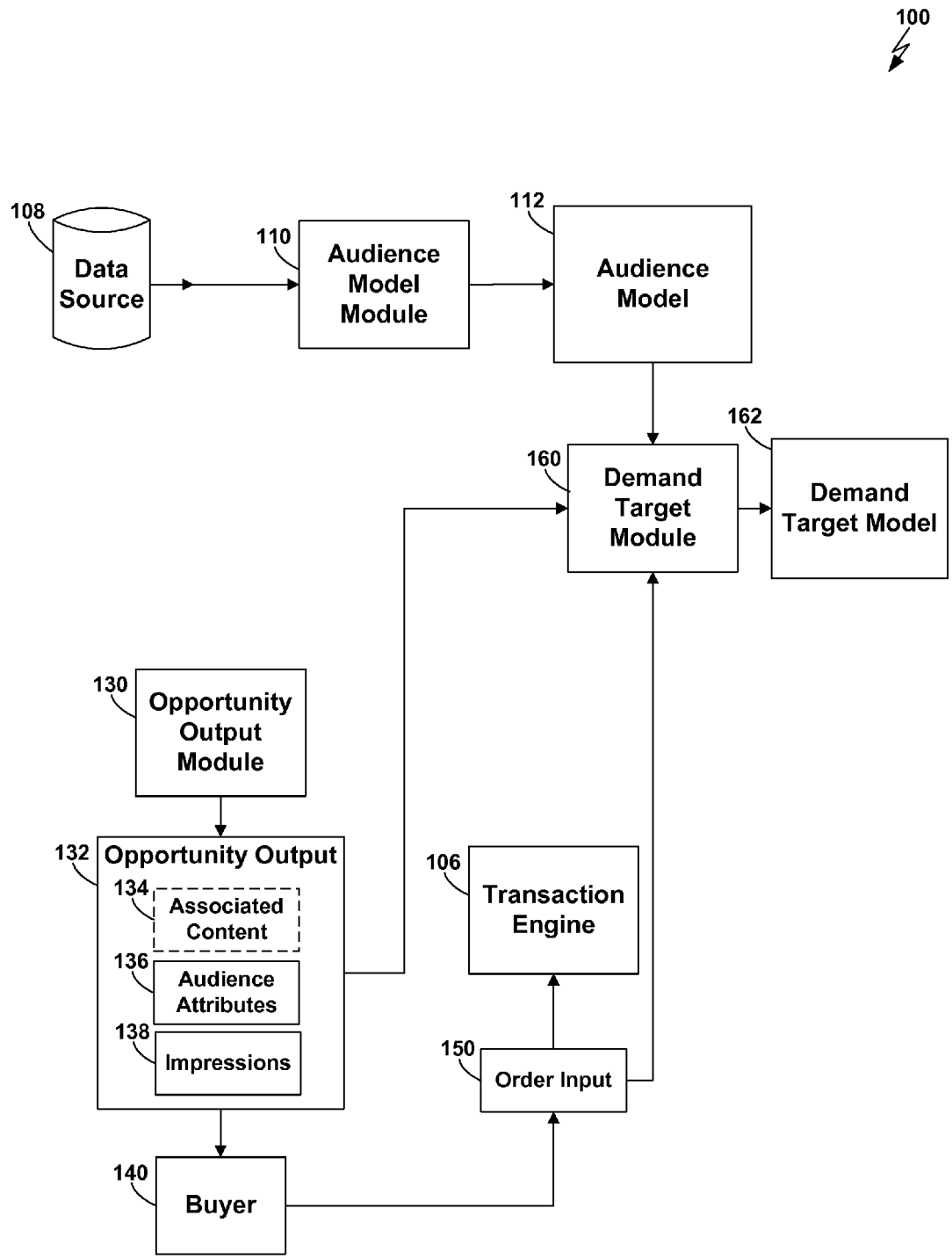
FIG. 1 is a dataflow diagram of a system for inferring characteristics of an audience targeted by a buyer of an advertisement placement opportunity according to one embodiment of the present invention.
Figure 2:
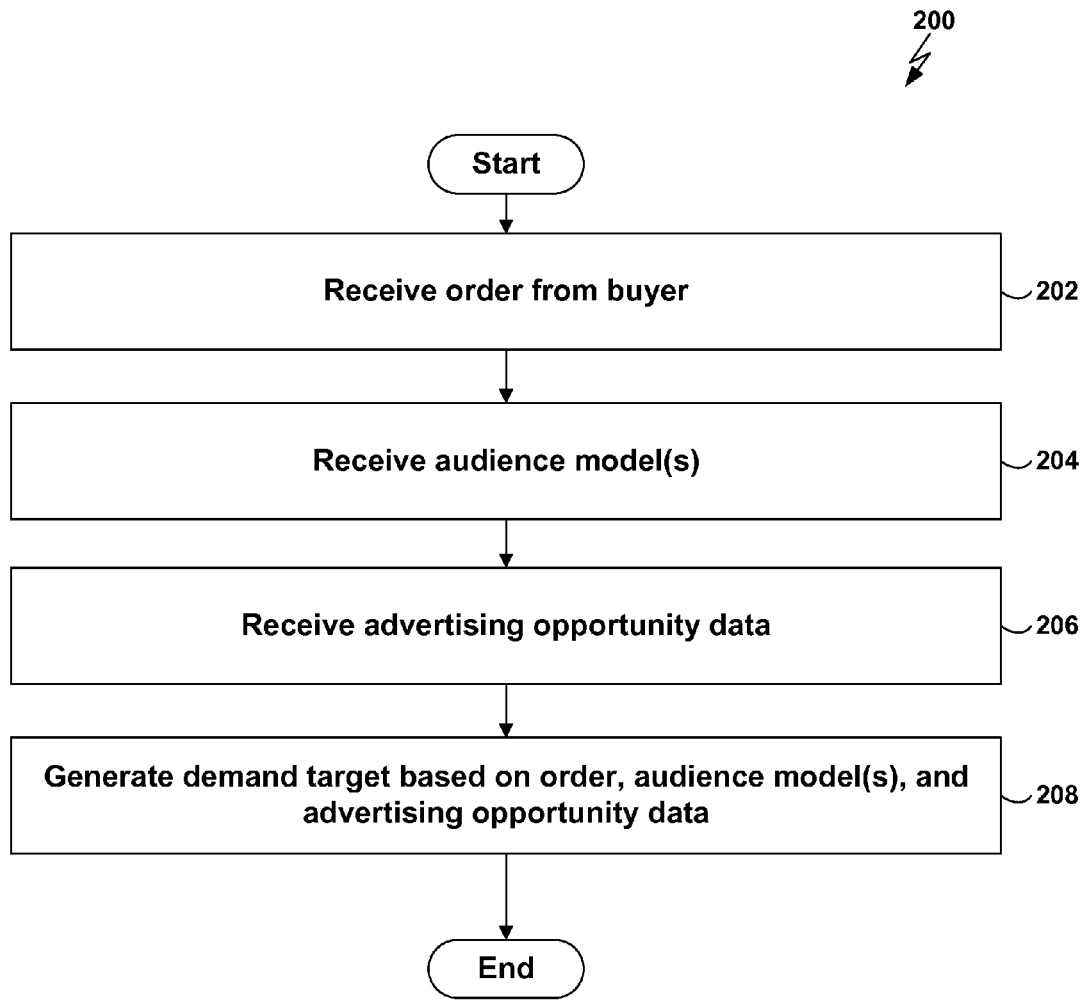
FIG. 2 is a flowchart of a method performed by the system of FIG. 1 according to one embodiment of the present invention.

For example, referring to FIG. 1, a dataflow diagram is shown of a system 100 for inferring characteristics of an audience targeted by a buyer 140 of an advertisement placement opportunity (such as a television advertisement placement opportunity) according to one embodiment of the present invention. Referring to FIG. 2, a flowchart is shown of a method 200 performed by the system 100 of FIG. 1 according to one embodiment of the present invention.

The system 100 enables advertising buyers, such as buyer 140, to purchase advertisement placement opportunities. For example, the system 100 may include an opportunity output module 120, which may provide opportunity output 132 to a buyer. The opportunity output 132 may include any data representing an advertisement placement opportunity, such as any one or more of the following:

Associated content data 134 representing particular content associated with the advertisement placement opportunity. The associate content data 134 may, for example, be or include any data that is conventionally used to specify content with an advertisement placement opportunity, such as the airtime of television content.

Audience attribute data 136 specifying one or more attributes of an actual and/or predicted audience for the advertisement placed within the advertisement placement opportunity. In general, the audience attribute data 136 may represent one or more attributes of the audience that views (or the predicted audience that is expected to view) the advertisement that is placed to fill the advertisement placement opportunity represented by the opportunity output 132.

Impression data 138 representing the total number of actual or predicted impressions associated with the content represented by the associated content data 134. As used herein, the term "impression" with respect to particular content (such as an advertisement) refers to a single person or household who has been exposed to (e.g., watched and/or listened to) the particular content (e.g., advertisement) for a sufficient period of time to perceive the advertisement's message (e.g., for at least six seconds).

The opportunity output 132 may take any of a variety of forms. For example, a computing device (such as a computing device used by the buyer 140) may render or otherwise manifest the opportunity output 132 to the buyer in the form of textual descriptions, tables, charts, graphs, or other visual representations of one or more of the audience attributes 136, impression data 138, and associated content 134, in any combination. Additionally or alternatively, the opportunity output 132 may include output which is not human-readable and which the opportunity output module 130 provides as digital data to another device, e.g., via an Application Program Interface (API). As another example, the opportunity output module 130 may store the opportunity output 132 in a data file, which may be manually processed by the buyer 140 or other user.

The buyer 140 may purchase the advertising opportunity represented by the opportunity output as the result of engaging in any of a variety of types of transactions. For example, the system 100 may include a transaction engine 106, which may enable the buyer 140 (and possibly other buyers, not shown in FIG. 1) to engage in any of a variety of types of auctions to purchase the advertising opportunity represented by the opportunity output 132. The buyer 140 may place an order for that advertising opportunity by providing order input 150 to the transaction engine 106 (FIG. 2, operation 202). In general, the order input 150 may be any input reflecting the buyer 140's decision to purchase one or more advertising opportunities (such as the advertising opportunity represented by the opportunity output 132). Note that the order input 150 may represent an order for multiple opportunities, such as an order for some number of Nielson rating points on a particular television network during prime time on weekends. Such an order by the buyer 140 may result in the buyer 140 purchasing multiple advertising opportunities satisfying the parameters specified by the order input 150.

In certain embodiments of the present invention, the audience attribute data 136 includes data describing the corresponding audience using only relatively general demographic information, such as any one or more of the following: gender (e.g., male or female), age range (e.g., 18-34), and income range (e.g., $30,000-$50,000). For example, the Nielsen rating service only provides audience information in terms of age and gender. The audience attribute data 136 may, for example, be audience information obtained from the Nielson rating service and may, therefore, represent audience information in terms of age and gender. Most agencies buy advertising placement opportunities nationally using Nielsen ratings as "currency"; to do so, they determine which programs or networks to buy based on their own internal calculations of which programs or networks will reach their target audiences, and then order a minimum guaranteed number of rating points in the age and/or gender bucket that most closely corresponds to their target audience. When the buyer 140 purchases the opportunity represented by the opportunity output 132, the buyer 140 purchases the ability to provide one or more advertisements in association with (e.g., embedded within or adjacent to, spatially and/or temporally) the content represented by the associated content data 134 or otherwise in association with the opportunity represented by the opportunity output 132. The decision by the buyer 140 to purchase such an advertising opportunity (as represented by the order input 150) reflects the buyer 140's conclusion that delivering advertisements in association with such an opportunity is likely to reach the buyer 140's desired audience.

As will be described in more detail below, embodiments of the present invention infer, from the buyer 140's order 150 and known characteristics of the audience(s) associated with the content (e.g., television programs) associated with the advertising opportunities purchased by the order 150, additional details about the buyer 140's target audience (i.e., details not contained within the audience attribute data 136 of the opportunity output 132). For example, if the audience attribute data 136 merely specifies that the audience represented by the audience attribute data 136 consists of women aged 18-34, embodiments of the present invention may infer, based on additional knowledge of the audience that is known and/or predicted to watch the associated content 134, that the audience desired to be reached by the buyer 140 includes adult unmarried women just out of college who are in the market for a compact car. As this example illustrates, embodiments of the present invention may generate audience models which are more detailed than those conventionally used in the sale of advertisement placement opportunities.

The system 100 may include data representing one or more models of audiences associated with particular content. For example, the system 100 may include a model 112 of the audience associated with the content represented by associated content data 134. If, for example, the content represented by associated content data 134 is a particular episode of the television program Glee, then the audience model 112 may contain data representing attributes of the (actual and/or predicted) audience for that episode of Glee.

As mentioned above, the order placed by the buyer 140 (as represented by order input 150) may be an order for multiple advertising opportunities, each of which may be associated with a distinct audience. Although only one audience model 112 is shown in FIG. 1 for ease of illustration, it should be understood that the system 100 may include any number of audience models, each of which may be associated with distinct corresponding content. Any description herein of the audience model 112 applies equally to such other audience models.

The audience model 112 may include any data representing the corresponding audience. For example, the system 100 may include an audience model module 110 which generates the audience model 112 based on a data source 108. The audience model 112 may include any data representing attributes of the (actual and/or predicted) audience for the advertising opportunity represented by the opportunity output 132.

The audience model 112 may include some or all of the data contained in the audience attribute data 136 in the opportunity output 132. The audience model 112 may include data that is not included in the audience attribute data 136 in the opportunity output 132. For example, the audience model 112 may include data representing attributes which are not represented by any data in the audience attribute data 136. As another example, the audience model 112 may include data representing an attribute value for a particular attribute, where the audience attribute data 136 includes one or more values for that particular attribute, but where the audience attribute data 136 does not include the value included in the audience model 112. For example, the value of a particular attribute (e.g., age) in the audience model 112 may be more specific (e.g., represent a smaller range) than the value of the same attribute in the audience attribute data 136.

The audience model 112 may include associated content data specifying the content associated with the audience model 112. The content "associated" with the audience model 112 may, for example, be content that actually was watched by the actual audience represented by the audience model 112, and/or content that is predicted to be watched by the (actual or predicted) audience represented by the audience model 112. The associated content data may represent the associated content in any of a variety of ways, such as by specifying one or more identifiers of the associated content, such as data representing one or more of the following: the name of the associated content (e.g., the name of a particular television program), the network (e.g., television network) or other distribution mechanism that broadcast or otherwise delivered the associated content, the airtime of the associated content, a particular episode of the associated content, a particular episode aired or otherwise delivered at a particular time, and a combination of a television network and a day part (e.g., 9 am-11 am, daytime, or prime time). The content represented by the associated content data may be any content, such as online content or television content. As used herein, the term "television content" includes any entertainment-grade long-form (e.g., 30 minutes in duration or longer) multimedia (i.e., video and audio) content, irrespective of whether it actually has been delivered to viewers by a television broadcast. For example, "television content," as that term is used herein, may be delivered to users solely online and not delivered to any users by television broadcast.

The audience model 112 may include audience attribute data (not shown) specifying one or more attributes of the audience represented by the audience model 112, and one or more values of each such attribute. Examples of attributes that may be included within the audience model 112 include the following attributes of some or all of the viewers in the corresponding audience, individually and/or in aggregate:

total number of viewers (e.g., individuals and/or households);
location(s) of viewers;
demographic attributes of viewers (such as age, gender, marital status, income, education, ethnicity, and number of children);
psychographic attributes of viewers; and
behavioral attributes of viewers (such as buying behavior and interests).

The audience model 112 may also include impression data (not shown) representing the total number of impressions associated with the content represented by the associated content data in the audience model 112.

The audience model 112 may, for example, include attributes that are not included within the ratings source (e.g., Nielsen ratings) that are used as currency for purchasing advertising opportunities. For example, if the ratings source that is used as currency only provides information about audience age and gender, the audience model 112 may include values of one or more attributes other than age and gender, such as income or viewing behavior.

The audience model 112 may, for example, contain information about the audience for the advertising opportunity purchased by the buyer 140 that is not contained within the audience attribute data 136 of the opportunity output 132 itself. For example, the audience attribute data 136 may only include relatively general demographic data about the audience (such as gender and age), whereas the audience model 112 may include data about the same (or overlapping) audience other than and/or in addition to such demographic data, such as income and behavior (e.g., viewing behavior and/or purchasing behavior).

The system 100 also includes a demand target module 160, which generates a demand target model 162 (FIG. 2, operation 208) based on one or more of the order input 150 (or any subset thereof) (FIG. 2, operation 202), the audience model 112 (FIG. 2, operation 204), and the opportunity output 132 (FIG. 2, operation 206). For example, the demand target module 160 may generate the demand target model 162 based on as little as the program(s)/network(s) and age/gender attributes contained within the order input 150. As another example, the demand target module 160 may generate the demand target model 162 based only on the audience attributes 136 (e.g., age and gender) and the associated content 134.

In general, the demand target model 162 includes data representing a prediction of the audience intended to be targeted by the buyer 140 by placing the order represented by the order input 150. The demand target model 162 may, for example, include any of the kinds of data disclosed herein in connection with the audience attributes 136 and the audience model 112. The demand target model 162 may include audience attribute data representing attributes and/or attribute values that are not contained within the audience attribute data 136. For example, if the audience attribute data 136 merely represents women aged 18-34, the demand target model 162 may include data representing adult unmarried women just out of college who are in the market for a compact car. As this example illustrates, the demand target module 160 may infer, from the audience model 112 and the audience attributes 136, additional audience attributes and/or attribute values not contained within the audience attributes 136, and include those additional inferred attributes and/or values within the demand target model 162.

As the above discussion implies, the audience attribute data 136 may include data representing one or more attributes, such as gender, age, and income. The demand target model 162 may include "additional attribute data," which may include data representing attributes which are not represented by any data in the attribute data 136. For example, if the attribute data 136 solely contains data representing values of the attributes of age and gender, the additional attribute data in the demand target model 162 may include data representing an attribute other than age and gender, such as income, in which case the demand target model 162 contains data representing an attribute (namely, income) that is not represented by any data in the attribute data 136. The demand target model 162 may, but need not, also include data representing some or all of the attributes represented by the attribute data 136. For example, if the attribute data 136 contains data representing values of the attributes of age and gender, the demand target model 162 may include data representing values of the attributes of age, gender, and income.

As another example, the additional attribute data in the demand target model 162 may contain data representing attribute values that are not represented by the audience attribute data 136. For example, as described above, the audience attribute data 136 may contain data representing a value of "women" for the attribute of gender and a value of "18-34" for the attribute of age, whereas the demand target model 162 may include data representing a value of "women" for the attribute of gender, a value of "21-25" for the attribute of age, a value of "unmarried" for the attribute of marital status, and value of "yes" for the attribute of seeking to purchase a compact car. As this example illustrates, the demand target model 162 may include different values for one or more of the same attributes as the audience attribute data 136. Such values in the demand target model 162 may, for example, be more specific than the corresponding values for the same attribute(s) in the audience attribute data 136. For example, the value of a particular attribute (e.g., age) in the demand target model 162 may be more specific (e.g., represent a smaller range) than the value of the same attribute in the audience attribute data 136.

As the above examples illustrate, the additional attribute data in the demand target model 162 may include one or both of: (1) data representing one or more attributes not represented in the audience attribute data 136, and (2) data representing more specific values of one or more attributes contained in the audience attribute data 136. For example, in the particular example described above, the demand target model 162 both:

contains data representing the attribute of marital status, whereas the audience attribute data 136 does not contain any data representing the attribute of marital status; and contains data representing more specific values of the attribute of age than the data representing age in the audience attribute data 136.

As mentioned above, the buyer 140's order (represented by order input 150) may be an order for multiple advertising opportunities. As a result, the demand target module 160 may receive as input, and generate the demand target model 162 based on, multiple opportunity outputs representing multiple advertising opportunities. Each such opportunity output may include any of the kinds of data disclosed herein in connection with the opportunity output 132.

The demand target module 160 may generate the demand target model 162 in any of a variety of ways. For example, the demand target module 160 may generate the demand target model 162 by making inferences from any one or more of the audience model 112, the audience attributes 136 (of one or more purchased advertising opportunities), and the associated content 134 (of one or more purchased advertising opportunities), using one or more statistical clustering techniques, such as k-means or expectation-maximization clustering.

Embodiments of the present invention have a variety of advantages, such as one or more of the following. As mentioned above, television advertising buyers purchase advertising opportunities with the goal of reaching particular desired audiences. The orders placed by buyers, however, do not contain direct information about the audiences that are known or expected to be reached by the buyer. Instead, such orders typically include only: (1) the desired programming, expressed in terms of either a program or a combination of network and daypart; and (2) the required audience guarantee, expressed as a certain number of rating points in a specific age/gender bin (e.g., males aged 18-34). The orders placed by buyers, therefore, do not directly reflect the audiences intended to be reached by such buyers.

Embodiments of the present invention address this problem by inferring, from the orders placed by advertising buyers, additional information about the audiences intended to be reached by such buyers. Such additional information may include, for example, demographic information about the targeted audience (e.g., age, gender, location, and income) and behavior (e.g., viewing behavior and/or purchasing behavior). Once such inferences have been accumulated across a large number of orders, embodiments of the present invention may present such inferences as buying patterns. An example of such a buying pattern is the purchase, by several automobile manufacturers, of the same programs against the same demographic (e.g., males aged 18-34). Such a buying pattern by automobile manufacturers may result from their common conclusion that such programs are popular with high school graduates in the market for low-end trucks. Suppliers of advertising opportunities may then use such buying patterns to price their inventory more appropriately.

Another advantage of embodiments of the present invention is that they may be used by advertising sellers to fulfill orders more optimally by finding equivalent and acceptable audiences in less-trafficked inventory. Since embodiments of the present invention may be used to reverse-engineer the "real" target audience of an advertising buyer (in the form of the demand target model 162), once such a real target audience has been identified for a particular buyer, embodiments of the present invention may be used to identify other inventory, not specifically selected by the buyer, which may satisfy the requirements of the buyer because such inventory is known or likely to reach the buyer's real target audience. By enabling sellers to market such alternate inventory to buyers, embodiments of the present invention enable sellers to increase the number and/or price of sales across a wide range of inventory.

Embodiments of the present invention may be implemented using any of a variety of machinery, such as one or more computers. Certain features and advantages of embodiments of the present invention are derived from the computer implementation of such embodiments and would not be obtained in the absence of such computer implementation. For example, the data source 108 may include a large amount and wide variety of data, which may be updated frequently. In the absence of a computer implementation of the audience model module 110—for example, if one were to attempt to generate the audience model 112 manually—the amount of time required to generate the audience model 112 would, in most practical situations, render the audience model 112 obsolete by the time it was needed for use by the demand target module 160. Similarly, in the absence of a computer implementation of the demand target module 160—for example, if one were to attempt to generate the demand target model 162 manually—the amount of time required to generate the demand target model 162 would, in most practical situations, render the demand target model 162 obsolete by the time it was needed. As particular example, the audience model module 110 may update the audience model 112 periodically, e.g., no more than every second, every 10 seconds, every minute, every 10 minutes, or every hour. As another example, the audience model module 110 may update the audience model 112 quickly (e.g., in no more than 1 second, 10 seconds, 1 minute, or 10 minutes) in response to a request from the demand target module 160 for an updated version of the audience module 112. Such performance requirements would not be possible to be met with a manual implementation of the audience model module 110. As these examples illustrate, the computer implementation of certain components of the system 100, such as the audience model module 110 and the demand target module 160, is not accidental or incidental to the system 100, but instead is inherent to the system 100.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Any module disclosed herein (such as the audience model module 110, the opportunity output module 120, the transaction engine 106, and the demand target module 160) may be implemented in any manner, such as by using custom-designed circuitry, computer hardware, computer software, or any combination thereof. Any input, output, and/or data disclosed herein (such as the data source 108, the audience module 112, the demand target model 162, the opportunity output 132, and the order input 150) may be implemented, for example, in the form of data stored in a non-transitory computer-readable medium. Any model disclosed herein (such as the audience model 112 and the demand target module 162) may be implemented, for example, as data stored in a non-transitory computer-readable medium. Any transmission of data from one module to another that is disclosed herein (such as the transmission of the order input 150 from the buyer 140 to the transaction engine 106) may be implemented in any of a variety of ways, such as by transmitting such data in the form of signals transmitted over a communications network, such as the Internet or a private intranet.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
   (A) receiving, from a buyer at a demand target module, order data representing an order placed by the buyer for an advertising opportunity;
   (B) receiving, from a data source other than the buyer and at the demand target module, audience model data representing a first plurality of attribute values of a first plurality of attributes of an audience for content associated with the advertising opportunity, without providing the audience model data to the buyer, wherein the order data does not include the audience model data, wherein the audience includes a plurality of viewers;
   (C) receiving, at the demand target module, first associated content data representing the content associated with the advertising opportunity, wherein the first associated content data represents a particular episode of a television program, including at least one of a program name, network, and daypart of the particular episode of the television program; and
   (D) at the demand target module, generating demand target data by inferring the demand target data from the order data, the audience model data, and the first associated content data, wherein the demand target data includes additional attribute data, wherein the additional attribute data includes at least one of:
      data representing an attribute not in the first plurality of attributes, wherein the attribute does not comprise age, gender, or daypart; and
      data representing an attribute value not in the first plurality of attribute values.

2. The method of claim 1, further comprising:
   (E) before (A), providing opportunity output data to the buyer, wherein the opportunity output data represents the advertising opportunity, and wherein the opportunity output data does not include the additional attribute data.

3. The method of claim 2, wherein the opportunity output data includes the associated content data.

4. The method of claim 2, wherein the audience model data includes data representing a value of a particular attribute, wherein the opportunity output data does not include any data representing any value of the particular attribute.

5. The method of claim 2, wherein the audience model data includes data representing a value of a particular attribute, wherein the opportunity output data does not include any data representing the value of the particular attribute.

6. The method of claim 2, wherein the audience model data includes second associated content data representing the content associated with the advertising opportunity.

7. The method of claim 2, wherein the opportunity output data includes data representing a second plurality of attribute values of a second plurality of attributes of the audience for the content associated with the advertising opportunity.

8. The method of claim 7, wherein the additional attribute data includes data representing an attribute not in the second plurality of attribute values.

9. The method of claim 7, wherein the additional attribute data includes data representing an attribute value not in the second plurality of attribute values.

10. The method of claim 1, wherein the audience for the content associated with the advertising opportunity comprises an actual audience for the content associated with the advertising opportunity.

11. The method of claim 1, wherein the audience for the content associated with the advertising opportunity comprises a predicted audience for the content associated with the advertising opportunity.

12. A non-transitory computer-readable medium comprising computer program instructions executable by at least one computer processor to perform a method, the method comprising:
  (A) receiving, from a buyer at a demand target module, order data representing an order placed by the buyer for an advertising opportunity;
  (B) receiving, from a data source other than the buyer and at the demand target module, audience model data representing a first plurality of attribute values of a first plurality of attributes of an audience for content associated with the advertising opportunity, without providing the audience model data to the buyer, wherein the order data does not include the audience model data, wherein the audience includes a plurality of viewers;
  (C) receiving, at the demand target module, first associated content data representing the content associated with the advertising opportunity, wherein the first associated content data represents a particular episode of a television program, including at least one of a program name, network, and daypart of the particular episode of the television program; and
  (D) at the demand target module, generating demand target data by inferring the demand target data from the order data, the audience model data, and the first associated content data, wherein the demand target data includes additional attribute data, wherein the additional attribute data includes at least one of:
    data representing an attribute not in the first plurality of attributes, wherein the attribute does not comprise age, gender, or daypart; and
    data representing an attribute value not in the first plurality of attribute values.

13. The non-transitory computer-readable medium of claim 12, wherein the method further comprises:
  (E) before (A), providing opportunity output data to the buyer, wherein the opportunity output data represents the advertising opportunity, and wherein the opportunity output data does not include the additional attribute data.

14. The non-transitory computer-readable medium of claim 13, wherein the opportunity output data includes the associated content data.

15. The non-transitory computer-readable medium of claim 13, wherein the audience model data includes data representing a value of a particular attribute, wherein the opportunity output data does not include any data representing any value of the particular attribute.

16. The non-transitory computer-readable medium of claim 13, wherein the audience model data includes data representing a value of a particular attribute, wherein the opportunity output data does not include any data representing the value of the particular attribute.

17. The non-transitory computer-readable medium of claim 13, wherein the audience model data includes second associated content data representing the content associated with the advertising opportunity.

18. The non-transitory computer-readable medium of claim 13, wherein the opportunity output data includes data representing a second plurality of attribute values of a second plurality of attributes of the audience for the content associated with the advertising opportunity.

19. The non-transitory computer-readable medium of claim 18, wherein the additional attribute data includes data representing an attribute not in the second plurality of attribute values.

20. The non-transitory computer-readable medium of claim 18, wherein the additional attribute data includes data representing an attribute value not in the second plurality of attribute values.

21. The non-transitory computer-readable medium of claim 12, wherein the audience for the content associated with the advertising opportunity comprises an actual audience for the content associated with the advertising opportunity.

22. The non-transitory computer-readable medium of claim 12, wherein the audience for the content associated with the advertising opportunity comprises a predicted audience for the content associated with the advertising opportunity.

* * * * *